(12) United States Patent
Kamiyama

(10) Patent No.: US 9,229,135 B2
(45) Date of Patent: Jan. 5, 2016

(54) COMPOSITION FOR FILM HAVING PRISM-TYPE RETROREFLECTION STRUCTURE FORMED ON THE SURFACE THEREOF

(75) Inventor: Hiroshi Kamiyama, Takasago (JP)

(73) Assignee: KANEKA CORPORATION, Osaka (JP)

( * ) Notice: Subject to any disclaimer, the term of this patent is extended or adjusted under 35 U.S.C. 154(b) by 909 days.

(21) Appl. No.: 13/388,018

(22) PCT Filed: Jul. 30, 2010

(86) PCT No.: PCT/JP2010/004836
§ 371 (c)(1),
(2), (4) Date: Jan. 30, 2012

(87) PCT Pub. No.: WO2011/013382
PCT Pub. Date: Feb. 3, 2011

(65) Prior Publication Data
US 2012/0128940 A1   May 24, 2012

(30) Foreign Application Priority Data

Jul. 31, 2009 (JP) ................................. 2009-179934
Apr. 28, 2010 (JP) ................................. 2010-104585

(51) Int. Cl.
| | | |
|---|---|---|
| *C08L 23/00* | (2006.01) | |
| *G02B 1/04* | (2006.01) | |
| *C08L 33/08* | (2006.01) | |
| *C08L 51/00* | (2006.01) | |
| *C09D 133/12* | (2006.01) | |
| *G02B 5/124* | (2006.01) | |
| *C08F 220/18* | (2006.01) | |

(52) U.S. Cl.
CPC . *G02B 1/04* (2013.01); *C08L 33/08* (2013.01); *C08L 51/003* (2013.01); *C09D 133/12* (2013.01); *C08F 2220/1825* (2013.01); *C08L 2205/02* (2013.01); *C08L 2205/03* (2013.01); *C08L 2205/035* (2013.01); *G02B 5/124* (2013.01); *Y10T 428/24479* (2015.01)

(58) Field of Classification Search
CPC ..... C08L 33/08; C08L 33/02; C08L 2205/02; C08L 2205/03; C08L 2205/035; C09D 133/12; G02B 1/04; G02B 5/124
USPC ............. 428/156; 524/504; 525/193, 194, 222
See application file for complete search history.

(56) References Cited

U.S. PATENT DOCUMENTS 6,309,739 B1 * 10/2001 Koizumi et al. ............... 428/220
2010/0092792 A1    4/2010 Inari et al.

FOREIGN PATENT DOCUMENTS

| JP | 02-069236 | 3/1990 |
|---|---|---|
| JP | 10-025321 | 1/1998 |
| JP | 11-060876 | 3/1999 |
| JP | 2001-081266 | 3/2001 |
| JP | 2002-080678 | 3/2002 |
| JP | 2004-331866 | 11/2004 |
| JP | 2007-047595 | 2/2007 |
| WO | 2008/056769 | 5/2008 |

OTHER PUBLICATIONS

International Search Report, International Application No. PCT/JP2010/004836, mailed Oct. 26, 2010, 2 pgs.

* cited by examiner

*Primary Examiner* — Nathan M Nutter
(74) *Attorney, Agent, or Firm* — Kagan Binder, PLLC

(57) ABSTRACT

Provided is a composition for use in producing a film having a prism type retroreflection structure, the composition being capable of favorably forming a prism type retroreflection structure by thermal transfer, while being superior in weather resistance and transparency and the film having breakage resistance. The composition contains: (A) an acrylic polymer produced by polymerizing (a-2) a monomer component in the presence of (A-1) a crosslinked acrylic polymer; and (B) a thermoplastic acrylic polymer, the composition having a fluidity (MFR: measured under heating at 230° C. and compression at 37.3 N) of 1 to 14, and having a gel content of 25 to 50% by weight with respect to 100% by weight in total of the acrylic polymer (A) and the thermoplastic acrylic polymer (B).

17 Claims, 2 Drawing Sheets

COMPOSITION FOR FILM HAVING PRISM-TYPE RETROREFLECTION STRUCTURE FORMED ON THE SURFACE THEREOF

TECHNICAL FIELD

The present invention relates to a composition for a film having a prism type retroreflection structure formed on the surface thereof, a film obtained from the composition, and a retroreflection sheet including the film.

BACKGROUND ART

General retroreflection sheets have a laminate structure constituted with a surface protective layer, a mid layer as needed, and a reflective element layer. A method for achieving a desired retroreflective property has been known in which a large number of micro prisms are provided on one surface of the reflective element layer (hereinafter, may be also referred to as "prism type retroreflection structure") as a means for achieving a retroreflective property.

For producing a reflective element layer having a prism type retroreflection structure (hereinafter, may be also referred to as "prism type retroreflective element layer"), a large number of micro prisms are formed on a film surface by carrying out thermal transfer to a flat film using a die for molding prisms. Thus, thermal transfer properties (prism formability) are required for materials that constitute a reflective element layer. Herein, the "thermal transfer property" means a performance required for forming micro prisms having a favorable shape by thermal transfer so as to enable the obtained reflective element layer to have a sufficient retroreflective property.

Conventionally employed materials that constitute a reflective element layer include polycarbonate resins in light of thermal transfer properties. However, polycarbonate resins are disadvantageous in terms of weather resistance. Therefore, a film constituted with an acrylic resin is laminated as a surface protective layer on a reflective element layer constituted with a polycarbonate resin to manufacture commercially products of retroreflection sheets that are favorable in weather resistance.

Also, when a prism type retroreflection sheet is industrially produced, it is necessary to cut a long prism type retroreflection sheet after the production to give an appropriate size; however, the micro prism on the surface of the sheet is likely to be an initiation point of a crack in the cutting, leading to a problem of ease in development of breakage of the sheet.

On the other hand, acrylic resins are advantageous in that they are superior in weather resistance and also superior in transparency, as is clear from use in the surface protective layers described above. However, acrylic films are disadvantageous in that upon application or attachment of the same on an undulatory substrate, breakage is likely to be developed at the resulting curved face portions.

In Patent Documents 1 and 2, an acrylic film that is superior in formability while securing transparency is reported, in which a crosslinked elastic acrylic resin is used. However, these documents merely investigate only formability upon in-mold molding, and thermal transfer properties are not in any way suggested. Still more, use of an acrylic resin as a component material of a reflective element layer having a prism type retroreflection structure is not also disclosed.

PRIOR ART DOCUMENTS

Patent Documents

Patent Document 1: Japanese Unexamined Patent Application, Publication No. 2002-80678
Patent Document 2: Japanese Unexamined Patent Application, Publication No. H11-60876

SUMMARY OF THE INVENTION

Problems to be Solved by the Invention

An object of the present invention which was made in view of the foregoing circumstances is to provide a composition for use in producing a film provided with a prism type retroreflection structure, the composition being capable of favorably forming a prism type retroreflection structure by thermal transfer, although an acrylic resin that is superior in weather resistance and transparency is used, and the formed film having breakage resistance.

Another object of the present invention is to provide a film having a prism type retroreflection structure that is superior in retroreflective characteristics and productivity, and further to provide a retroreflection sheet.

Means for Solving the Problems

The present inventors thoroughly investigated, and consequently found that a film provided with a prism type retroreflection structure that is superior in transparency and weather resistance, and has superior prism thermal transfer properties and breakage resistance can be produced by mixing a crosslinked acrylic polymer as a rubber and a thermoplastic acrylic polymer so as to give a gel content falling within a certain range, and constituting the composition so as to give a fluidity falling within a certain range. Accordingly, the present invention was accomplished.

More specifically, an aspect of the present invention relates to a composition for a film having a prism type retroreflection structure formed on the surface thereof, the composition containing: (A) an acrylic polymer produced by polymerizing (a-2) a monomer component in the presence of (A-1) a crosslinked acrylic polymer; and (B) a thermoplastic acrylic polymer, the composition having a fluidity (MFR: measured under heating at 230° C. and compression at 37.3 N) of 1 to 14, and having a gel content of 25 to 50% by weight with respect to 100% by weight in total of the acrylic polymer (A) and the thermoplastic acrylic polymer (B).

In the present invention, it is preferred that:
the acrylic polymer (A) is produced by polymerizing the monomer component (a-2) containing not less than 80% by weight of a methacrylic acid ester, and 20 to 0% by weight of an acrylic acid ester and/or other copolymerizable vinyl monomer, in the presence of the crosslinked acrylic polymer (A-1);
the acrylic polymer (A) is in a particulate form having a weight average particle diameter of 300 to 3,000 Å;
the acrylic polymer (A) has a reduced viscosity (as measured with a 0.3% solution in N,N'-dimethylformamide at 30° C.) of methyl ethyl ketone (MEK) soluble-matter being not greater than 0.35 dl/g; and
the crosslinked acrylic polymer (A-1) is produced by copolymerizing a monomer component (a-1) containing an acrylic monomer and a polyfunctional monomer having two or more nonconjugated double bonds per molecule and being capable of copolymerizing with the acrylic monomer, and has a single-layer or multilayer structure.

Furthermore, the monomer component (a-1) preferably contains the polyfunctional monomer in an amount of 0.2 to 2 parts by weight with respect to 100 parts by weight of monomer(s) other than the polyfunctional monomer.

Moreover, the graft rate of the monomer component (a-2) to the crosslinked acrylic polymer (A-1) is preferably 50 to 140% by weight.

Additionally, each layer constituting the crosslinked acrylic polymer (A-1) preferably has a glass transition temperature of less than 0° C.

In the present invention, it is preferred that the thermoplastic acrylic polymer (B) contains (B1) a thermoplastic acrylic polymer that is produced by copolymerizing a monomer component containing not less than 95% by weight of a methacrylic acid ester and not greater than 5% by weight of an acrylic acid ester and/or other copolymerizable vinyl monomer, and exhibits a fluidity of not greater than 8 (MFR: measured under heating at 230° C. and compression at 37.3 N), and (B2) a thermoplastic acrylic polymer that is produced by copolymerizing a monomer component containing not less than 92% by weight of a methacrylic acid ester and not greater than 8% by weight of an acrylic acid ester and/or other copolymerizable vinyl monomer, and exhibits a fluidity of not less than 15 (MFR: measured under heating at 230° C. and compression at 37.3 N), in which the weight ratio of the (B1)/(B2) is 10/90 to 90/10. According to this constitution, in addition to superior thermal transfer properties and breakage resistance, favorable die releasability can be achieved; therefore, productivity of a film provided with a prism type retroreflection structure can be superior.

In the present invention, it is preferred that the thermoplastic acrylic polymer (B) is (B3) a thermoplastic acrylic polymer that is produced by copolymerizing a monomer component containing not less than 80% by weight of a methacrylic acid ester and 0 to 20% by weight of an acrylic acid ester and/or other copolymerizable vinyl monomer, and has a reduced viscosity of not greater than 0.35 dl/g (as measured with a 0.3% solution in N,N'-dimethylformamide at 30° C.)

In the present invention, the composition preferably has a Vicat softening temperature of not less than 85° C. This enables favorable die releasability to be achieved even when detachment of the film provided with a prism type retroreflection structure from the die at a temperature as high as 85° C. immediately after the thermal transfer is intended.

A first aspect of the present invention provides a composition for a film having a prism type retroreflection structure formed on the surface thereof, the composition containing the following acrylic polymer (A), the following thermoplastic acrylic polymer (B1) and the following thermoplastic acrylic polymer (B2), the weight ratio of the (B1)/(B2) being 10/90 to 90/10, and the gel content being 25 to 50% by weight with respect to 100% by weight in total of the acrylic polymer (A), the thermoplastic acrylic polymer (B1) and the thermoplastic acrylic polymer (B2).

Acrylic polymer (A):

being produced by polymerizing a monomer component (a-2) containing not less than 80% by weight of a methacrylic acid ester, and 20 to 0% by weight of an acrylic acid ester and/or other copolymerizable vinyl monomer, in the presence of a crosslinked acrylic polymer (A-1);

being in a particulate form having a weight average particle diameter of 300 to 3,000 Å; and having a reduced viscosity (as measured with a 0.3% solution in N,N'-dimethylformamide at 30° C.) of methyl ethyl ketone (MEK) soluble-matter being not greater than 0.35 dl/g.

Wherein, the crosslinked acrylic polymer (A-1) is produced by copolymerizing a monomer component (a-1) containing an acrylic acid ester and a polyfunctional monomer having two or more nonconjugated double bonds per molecule and being capable of copolymerizing with the acrylic acid ester, and has a single-layer or multilayer structure.

Thermoplastic acrylic polymer (B1):

being produced by copolymerizing a monomer component containing not less than 95% by weight of a methacrylic acid ester and not greater than 5% by weight of an acrylic acid ester and/or other copolymerizable vinyl monomer, and exhibits a fluidity of not greater than 8 (MFR: measured under heating at 230° C. and compression at 37.3 N).

Thermoplastic acrylic polymer (B2):

being produced by copolymerizing a monomer component containing not less than 92% by weight of a methacrylic acid ester and not greater than 8% by weight of an acrylic acid ester and/or other copolymerizable vinyl monomer, and exhibits a fluidity of not less than 15 (MFR: measured under heating at 230° C. and compression at 37.3 N).

A second aspect of the present invention relates to a composition for a film having a prism type retroreflection structure formed on the surface thereof, the composition containing the following acrylic polymer (A) and the following thermoplastic acrylic polymer (B3), and the gel content being 25 to 50% by weight with respect too 100% by weight in total of the acrylic polymer (A) and the thermoplastic acrylic polymer (B3).

Acrylic polymer (A):

being produced by polymerizing a monomer component (a-2) containing not less than 80% by weight of a methacrylic acid ester and 20 to 0% by weight of an acrylic acid ester, in the presence of a crosslinked acrylic polymer (A-1);

having a graft rate of the monomer component (a-2) to the crosslinked acrylic polymer (A-1) being 50 to 140% by weight;

being in a particulate form having a weight average particle diameter of 300 to 3,000 Å; and having a reduced viscosity (as measured with a 0.3% solution in N,N'-dimethylformamide at 30° C.) of methyl ethyl ketone (MEK) soluble-matter being not greater than 0.35 dl/g.

Wherein, the crosslinked acrylic polymer (A-1) is produced by copolymerizing a monomer component (a-1) containing 100 parts by weight of an acrylic monomer and 0.2 to 2 parts by weight of a polyfunctional monomer having two or more nonconjugated double bonds per molecule and being capable of copolymerizing with the acrylic monomer, and has a single-layer or multilayer structure, with each layer constituting the crosslinked acrylic polymer (A-1) having a glass transition temperature of less than 0° C.

Thermoplastic acrylic polymer (B3):

being produced by copolymerizing a monomer component containing not less than 80% by weight of a methacrylic acid ester, and 0 to 20% by weight of an acrylic acid ester and/or other copolymerizable vinyl monomer, and has a reduced viscosity of not greater than 0.35 dl/g (as measured with a 0.3% solution in N,N'-dimethylformamide at 30° C.)

It is preferred that the composition of the present invention further contains a colorant.

Also, another aspect of the present invention relates to an acrylic film, which was obtained from the composition, and has a prism type retroreflection structure formed on the surface thereof. The acrylic film preferably has a thickness of 10 to 500 μm.

Furthermore, yet another aspect of the present invention relates to a retroreflection sheet constituted with the acrylic film, and a retroreflection sheet constituted with an acrylic film and a surface protective film laminated on the acrylic film on the surface on which the prism type retroreflection structure was not formed.

Effects of the Invention

According to the composition of the present invention, an acrylic film provided with a prism type retroreflection structure can be produced which is superior in transparency and weather resistance, and has superior thermal transfer properties and breakage resistance.

Although an acrylic resin is used, the film and the retroreflection sheet of the present invention are superior in retroreflective characteristics, and due to improved breakage resistance, excellent productivity is achieved as breakage is less likely to occur when the film is cut after the production. In addition, it is also advantageous in that breakage is less likely to occur when the film is folded. According to the present invention, a retroreflection sheet can be constructed without using a surface protective layer; therefore, thinning of a retroreflection sheet is enabled.

DESCRIPTION OF EMBODIMENTS

Figure 1:
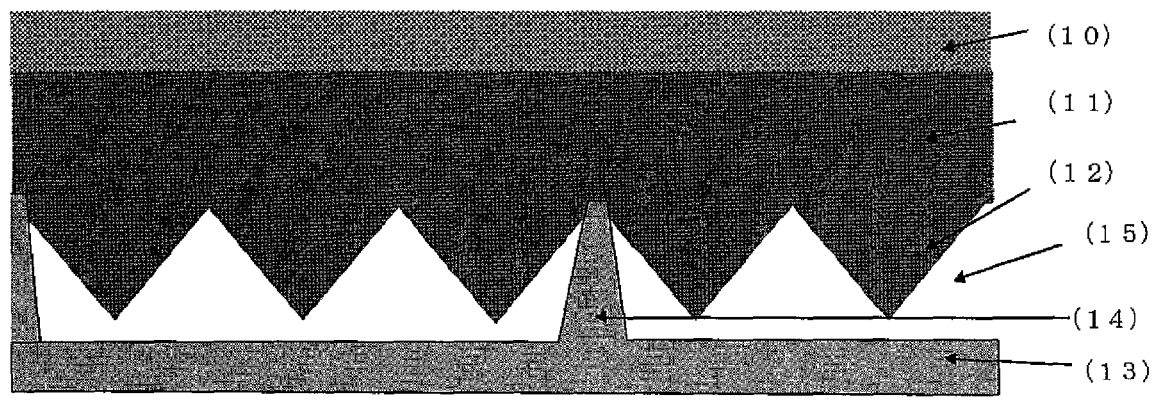
FIG. 1 shows a diagram illustrating a retroreflective reflection sheet including a surface protective layer.

The composition of the present invention contains (A) an acrylic polymer and (B) a thermoplastic acrylic polymer.

The acrylic polymer (A) as herein referred to means a product of polymerization of a monomer component (a-2) in the presence of a crosslinked acrylic polymer particle (A-1). The crosslinked acrylic polymer particle means a product of crosslinking of acrylic polymer particles with a polyfunctional monomer. By using not merely acrylic polymer particles, but crosslinked acrylic polymer particles, viscoelasticity can be imparted to the composition, thereby enabling breakage resistance to be improved. It is to be noted that "acrylic polymer" or "acrylic monomer" as used herein includes "methacrylic polymer" or "methacrylic monomer".

The thermoplastic acrylic polymer (B) is an acrylic polymer that exhibits thermoplasticity. By blending the thermoplastic acrylic polymer, a fluidity of the composition during heating improves, and thus improvement of thermal transfer properties (prism formability by thermal transfer, in turn, retroreflective characteristics) is enabled. Only one type of the thermoplastic acrylic polymer (B) may be used, or two or more types may be used in combination. In light of the adjustment of fluidity and Vicat softening temperature described later, it is most preferred that two types of the thermoplastic acrylic polymer (B) are used in combination. It should be noted that "thermoplastic acrylic polymer" as referred to herein also includes "thermoplastic methacrylic polymer".

The fluidity (MFR: measured under heating at 230° C. and compression at 37.3 N) exhibited by the composition of the present invention falls within the range of 1 to 14. By controlling the fluidity of the composition to fall within this range, thermal transfer properties achieved when a prism type retroreflection structure is formed can be maintained to fall within a favorable range, and thus obtaining a prism type retroreflection sheet having a superior retroreflective characteristic is enabled. When the fluidity is less than 1, a micro prism structure having a desired shape cannot be formed by thermal transfer due to low fluidity, leading to failure in obtaining a prism type retroreflection sheet having a superior retroreflective characteristic. Since superior thermal transfer properties can be attained even if thermal transfer is carried out at lower temperatures, the fluidity exhibited by the composition of the present invention preferably falls within the range of 3 to 14, and more preferably falls within the range of 5 to 14. Satisfactory value of the fluidity can be provided by adjusting constitutions and compounding rate of the acrylic polymer (A) and the thermoplastic acrylic polymer (B).

The fluidity (MFR) in the present invention is determined in accordance with JIS K7210, in terms of the amount of a resin (unit: g/10 min) extruded in 10 min from an opening (nozzle) provided at the bottom of a cylindrical vessel which had been heated with a heater in which a certain amount of a sample (polymer or composition) was heated at 230° C. with compression at 37.3 N. The test equipment employed is an extrusion type plastometer as defined according to JIS K6760.

In the composition of the present invention, the gel content with respect to 100% by weight in total of the acrylic polymer (A) and the thermoplastic acrylic polymer (B) is 25 to 50% by weight. The gel content serves as a marker of a compounding rate of the rubber component, i.e., the crosslinked acrylic polymer (A-1), contained in the composition. When the gel content falls within this range, superior thermal transfer properties, and breakage resistance can be achieved. The gel content being less than 25% by weight results in failure in improving breakage resistance due to small compounding rate of the crosslinked acrylic polymer particles (i.e., compounding rate with respect to the total of (A) and (B)). When the gel content exceeds 50% by weight, the fluidity is lowered due to a great compounding rate of the crosslinked acrylic polymer particles, and consequently, favorable thermal transfer properties cannot be achieved. The gel content is preferably 30 to 50% by weight, and more preferably 30 to 45% by weight.

Since the gel content of the thermoplastic acrylic polymer (B) is 0, the gel content (% by weight) with respect to 100% by weight in total of the acrylic polymer (A) and the thermoplastic acrylic polymer (B) can be calculated by multiplying the gel content (% by weight) of the acrylic polymer (A) by the compounding rate of the acrylic polymer (A) (compounding rate with respect to the total of (A) and (B)).

The gel content of the acrylic polymer (A) is determined by: placing dry resin powders of the acrylic polymer (A) on a 100-mesh wire mesh in a predetermined amount, immersing in methyl ethyl ketone for 48 hrs, drying the sample remaining on the wire mesh under reduced pressure, measuring the weight after removing methyl ethyl ketone to give a constant weight, and calculating according to the following formula (1):

gel content (% by weight) of the acrylic polymer (A)= (weight after drying under reduced pressure/ weight of dry resin powders)×100     (1)

The gel content (% by weight) with respect to 100% by weight in total of the acrylic polymer (A) and the thermoplastic acrylic polymer (B) is determined by multiplying the gel content (% by weight) of the acrylic polymer (A) by the compounding rate of the acrylic polymer (A), and calculating according to the following formula (2). Wherein, the compounding rate of the acrylic polymer (A) means a compounding rate (weight ratio) of the acrylic polymer (A) with respect to the total of the acrylic polymer (A) and the thermoplastic acrylic polymer (B).

Gel content with respect to 100% by weight in total of the acrylic polymer ($A$) and the thermoplastic acrylic polymer ($B$)(% by weight)=(gel content (% by weight) of the acrylic polymer ($A$))×(compounding rate of the acrylic polymer ($A$)) (2)

In addition, a mixture of the acrylic polymer (A) and the thermoplastic acrylic polymer (B) may be employed as a subject of the measurement of the gel content, and thus the gel content with respect to 100% by weight in total of the acrylic polymer (A) and the thermoplastic acrylic polymer (B) may be also determined by measuring and calculating according to the above formula (1).

The composition of the present invention has a Vicat softening temperature of preferably not less than 85° C. When the Vicat softening temperature falls within this range, upon release of the film having the prism type retroreflection structure formed thereon from the die immediately after the thermal transfer step, favorable die releasability can be attained. In particular, when the release is carried out at comparatively high temperatures (for example, 85° C.) in order to improve the productivity, micro prisms are likely to be deformed due to the stress applied during the release provided that the composition is in a softened state, and thus retroreflective characteristics are likely to deteriorate. When the Vicat softening temperature is not less than 85° C., deterioration of the retroreflective characteristic during the release can be inhibited since the prism composition fails to be softened even if the release is carried out at the aforementioned high temperatures. In order to improve the die releasability in the case in which the release is carried out at higher temperatures, the Vicat softening temperature is more preferably not less than 88° C., and still more preferably not less than 90° C. The Vicat softening temperature is measured with a method in accordance with JIS K7206. Specifically, a test piece having a defined size is placed in a heating bath, and the temperature of the bath is elevated in the state in which the end face having a certain cross sectional area (1 mm$^2$) is pressed against the center portion of the test piece at a load of 5 kgf/cm$^2$. The temperature at which the end face penetrates to a certain (1 mm) level of the depth of the test piece is determined as a Vicat softening temperature (unit: ° C.).

It is preferred that the acrylic polymer (A) of the present invention is obtained by polymerizing the monomer component (a-2) containing not less than 80% by weight of a methacrylic acid ester, and 20 to 0% by weight of an acrylic acid ester and/or other copolymerizable vinyl monomer, in the presence of the crosslinked acrylic polymer (A-1). In this polymerization, a part of the monomer component (a-2) is graft polymerized onto the crosslinked acrylic polymer particle (A-1), whereby the polymer chain composed of the monomer component (a-2) is bound to the crosslinked acrylic polymer particle (A-1). The remainder of the monomer component (a-2) does not graft polymerize onto the crosslinked acrylic polymer particle (A-1), but constitutes a free polymer, and thus included as the free polymer in the acrylic polymer (A).

The crosslinked acrylic polymer (A-1) is a crosslinked acrylic polymer that is obtained by copolymerizing monomer component (a-1) containing an acrylic monomer, and a polyfunctional monomer having two or more nonconjugated double bonds per molecule and being capable of copolymerizing with the acrylic monomer, and has a single-layer or multilayer structure.

The acrylic monomer as referred to herein has a meaning to include acrylic acid esters and methacrylic acid esters.

Examples of the acrylic acid ester include methyl acrylate, ethyl acrylate, propyl acrylate, butyl acrylate, 2-ethylhexyl acrylate, n-octyl acrylate, and the like. Of these, acrylic acid alkyl esters are preferred. The number of carbon atoms of the alkyl group is more preferably 1 to 8. These may be used alone, or two or more thereof may be used in combination.

Examples of the methacrylic acid ester include methyl methacrylate, ethyl methacrylate, propyl methacrylate, butyl methacrylate, and the like. Of these, methacrylic acid alkyl esters are preferred. The number of carbon atoms of the alkyl group is more preferably 1 to 4, and still more preferably 1. These may be used alone, or two or more thereof may be used in combination.

The monomer component (a-1) may further contain other copolymerizable vinyl monomer.

Examples of the other copolymerizable vinyl monomer include vinyl halides such as vinyl chloride and vinyl bromide, vinyl cyanides such as acrylonitrile and methacrylonitrile, vinyl esters such as vinyl formate, vinyl acetate and vinyl propionate, aromatic vinyl such as styrene, vinyltoluene and α-methylstyrene, aromatic vinyl derivatives such as o-chlorethylene and m-chlorethylene, vinylidene halides such as vinylidene chloride and vinylidene fluoride, acrylic acid and salts thereof such as acrylic acid, sodium acrylate and calcium acrylate, acrylic acid alkyl ester derivatives such as β-hydroxyethyl acrylate, dimethylaminoethyl acrylate, glycidyl acrylate, acrylamide and N-methylolacrylamide, methacrylic acid and salts thereof such as methacrylic acid, sodium methacrylate and calcium methacrylate, methacrylic acid alkyl ester derivatives such as methacrylamide, β-hydroxyethyl methacrylate, dimethylaminoethyl methacrylate and glycidyl methacrylate, and the like. Of these, aromatic vinyl derivatives are preferred in light of adjustment of the refractive index by a monomer having a high refractive index. These copolymerizable vinyl monomers may be used alone, or two or more thereof may be used in combination.

The polyfunctional monomer having two or more nonconjugated double bonds per molecule and being capable of copolymerizing with the acrylic monomer (hereinafter, may be also referred to as merely "polyfunctional monomer") is a component that affects the gel content of the crosslinked acrylic polymer (A-1) as well as the graft rate to the crosslinked acrylic polymer (A-1), and serves as a crosslinking agent, and a grafting agent. Specific examples include vinyl group-containing polyfunctional monomers such as ethylene glycol dimethacrylate, diethylene glycol dimethacrylate, dipropylene glycol dimethacrylate, ethylene glycol diacrylate, diethylene glycol diacrylate, dipropylene glycol diacrylate, divinylbenzene and divinyl adipate; allyl group-containing polyfunctional monomers such as diallyl phthalate, diallyl maleate, allyl acrylate, allyl methacrylate, triallyl cyanurate and triallyl isocyanurate; and the like. These may be used alone, or two or more thereof may be used in combination.

The monomer component (a-1) preferably contains the acrylic acid ester in an amount of preferably not less than 40% by weight, and more preferably not less than 50% by weight with respect to 100% by weight of the vinyl monomer component. When the compounding rate of the acrylic acid ester is less than 40% by weight, the breakage resistance is likely to be lowered. The "vinyl monomer component" as referred to herein means a monomer component except for the polyfunctional monomer.

The monomer component (a-1) preferably contains the methacrylic acid ester in an amount of preferably 0 to 40% by weight, and more preferably 0 to 20% by weight with respect to 100% by weight of the vinyl monomer component.

When the other copolymerizable vinyl monomer is used, the monomer component (a-1) preferably contains the other copolymerizable vinyl monomer in an amount of preferably 0 to 20% by weight, and more preferably 0 to 10% by weight with respect to 100% by weight of the vinyl monomer component.

The amount of the polyfunctional monomer is preferably 0.2 to 2 parts by weight, and more preferably 0.3 to 1.5 parts by weight with respect to 100 parts by weight of the monomer(s) other than the polyfunctional monomer contained in the monomer component (a-1). When the amount is less than 0.2 parts by weight, the breakage resistance is likely to be lowered. On the other hand, when the amount is greater than 2 parts by weight, thermal transfer properties are likely to deteriorate.

The process for producing the crosslinked acrylic polymer (A-1) in the present invention is not particularly limit, and a known emulsion polymerization process, emulsification-suspension polymerization process, suspension polymerization process, bulk polymerization process or solution polymerization process may be applied. Among these, an emulsion polymerization process is particularly preferred.

In the emulsion polymerization process for producing the crosslinked acrylic polymer (A-1), multilayered crosslinked acrylic polymer (A-1) can be formed by changing the type and the proportion of the monomer component or the polyfunctional monomer. The difference in refractive indices of the monomer components used for each layer is preferably as small as possible, and the transparency may be likely to be impaired when the difference is too great.

Each layer constituting the crosslinked acrylic polymer (A-1) has a glass transition temperature (Tg) of preferably less than 0° C., and more preferably less than −5° C. When Tg is not greater than 0° C., more superior breakage resistance of the film can be attained.

Tg as referred to herein is a value determined according to a Fox formula using the value described in "Polymer Hand Book (J. Brandrup, Interscience, 1989)". However, the value is calculated without including the polyfunctional monomer, any initiator and surfactant.

The methacrylic acid ester to be contained in the monomer component (a-2) may be similar to the methacrylic acid ester used in the crosslinked acrylic polymer (A-1) described above. In particular, methacrylic acid alkyl esters are preferred. The number of carbon atoms of the alkyl group is more preferably 1 to 4, and more preferably 1.

The acrylic acid ester to be contained in the monomer component (a-2) may be similar to the acrylic acid ester used in the crosslinked acrylic polymer (A-1) described above. In particular, acrylic acid alkyl esters are preferred. The number of carbon atoms of the alkyl group is more preferably 1 to 8.

The other copolymerizable vinyl monomer which can be used in the monomer component (a-2) may be similar to the other copolymerizable vinyl monomer which may be used in the monomer component (a-1) described above.

These methacrylic acid ester, acrylic acid ester, and other copolymerizable vinyl monomer may be used alone, or two or more thereof may be used in combination.

The monomer component (a-2) preferably contains not less than 80% by weight of the methacrylic acid ester. In light of the solvent resistance and heat resistance, the methacrylic acid ester is contained in an amount of more preferably not less than 85% by weight, and still more preferably not less than 90% by weight. The upper limit may be 100% by weight.

The monomer component (a-2) preferably contains 20 to 0% by weight of the acrylic acid ester and/or the other copolymerizable vinyl monomer. In light of the solvent resistance and heat resistance, the acrylic acid ester and/or the other copolymerizable vinyl monomer are/is contained in an amount of more preferably 15 to 0% by weight, and still more preferably 10 to 0% by weight.

The process for producing the acrylic polymer (A) may be exemplified by a suspension polymerization process, an emulsion polymerization process and the like, and an emulsion polymerization process is preferred.

In the case of the emulsion polymerization process, a common polymerization initiator, particularly a polymerization initiator that generates a free radical is preferably used. Specific examples of such polymerization initiators include e.g., inorganic peroxides such as potassium persulfate and sodium persulfate, organic peroxides such as cumene hydroperoxide and benzoyl peroxide, and the like. Alternatively, an oil-soluble initiator such as azobisisobutyronitrile may be also used. These may be used alone, or two or more thereof may be used in combination.

These polymerization initiators may be used as a common redox type polymerization initiator prepared in combination with a reducing agent such as sodium sulfite, sodium thiosulfuraste, sodium formaldehydesulfoxylate, ascorbic acid or ferrous sulphate.

Also, the surfactant for use in the emulsion polymerization process is not particularly limited, and general surfactants may be used as long as they are for use in emulsion polymerization. For example, anionic surfactants such as sodium alkylsulfate, sodium alkylbenzenesulfonate and sodium laurate, nonionic surfactants such as reaction products of an alkylphenol with ethylene oxide, and the like may be exemplified. These surfactants may be used alone, or two or more thereof may be used in combination. Furthermore, a cationic surfactant such as alkylamine hydrochloride may be used as needed.

A polymer latex obtained by the emulsion polymerization process is subjected to common coagulation (for example, coagulation carried out using a salt) and washing, or a treatment such as spray or freeze drying, thereby separating and recovering the polymer from water.

The monomer component (a-2) may be copolymerized in the presence of a chain transfer agent. The chain transfer agent is preferably selected for use from among those usually employed in radical polymerization. Specifically, examples of the chain transfer agent include alkyl mercaptan having 2 to 20 carbon atoms, mercapto acids, thiophenol, carbon tetrachloride, and the like. These may be used alone, or in combination of two or more thereof.

The graft rate of the monomer component (a-2) to the crosslinked acrylic polymer (A-1) is preferably 50 to 140% by weight, and more preferably 60 to 120% by weight. When the graft rate is 50 to 140% by weight, both the thermal transfer properties and the breakage resistance can be superior. The graft rate can be regulated by adjusting the amount of the polyfunctional monomer used, and conditions such as polymerization temperature.

The graft rate as referred to herein means a percentage of graft chains bound to the crosslinked acrylic polymer particles (A-1) (the polymer chains composed of the monomer component (a-2)) with respect to the crosslinked acrylic polymer particles (A-1). Specifically, the graft rate is a value determined by: dispersing/dissolving 1 g of dry resin powders of the acrylic polymer (A) in 50 ml of methyl ethyl ketone; separating into insoluble matter and soluble matter by a centrifugal separator (30,000 rpm×2 hrs); vacuum drying the insoluble matter; weighing sufficiently dried matter as rubber graft matter; and calculating according to the following formula:

graft rate (%)=((weight of rubber graft matter−weight of crosslinked acrylic polymer (A-1))/weight of crosslinked acrylic polymer (A-1))×100

The acrylic polymer (A) is preferably in a particulate form having a weight average particle diameter of 300 to 3,000 Å. When the particle diameter falls within this range, more superior transparency and breakage resistance can be achieved. The particle diameter is more preferably 500 to 2,000 Å, more preferably 600 to 1,800 Å, and most preferably 700 to 1,500 Å.

The weight average particle diameter of the acrylic polymer (A) is determined using a diluted acrylic polymer (A) latex at a solid content of 0.02% as a sample, based on the light transmittance at a wavelength of 546 nm measured with a spectrophotometer (manufactured by HITACHI, Spectrophotometer U-2000) at a temperature of 23° C.±2° C. and a humidity of 50%±5%.

The reduced viscosity exhibited by the methyl ethyl ketone soluble-matter of the acrylic polymer (A) is preferably not greater than 0.35 dl/g, and more preferably not greater than 0.32 dl/g. The reduced viscosity of not greater than 0.35 dl/g leads to superior thermal transfer properties. The reduced viscosity is determined by dissolving methyl ethyl ketone soluble-matter of the acrylic polymer (A) in N,N'-dimethylformamide to prepare a 0.3% solution in N,N'-dimethylformamide, and measuring the value on the solution at 30° C. The reduced viscosity serves as a marker of the content of the free polymer contained in the acrylic polymer (A). The lower reduced viscosity indicates a lower content of the free polymer.

As the thermoplastic acrylic polymer (B) of the present invention, a variety of thermoplastic acrylic polymers can be used as long as the fluidity (MFR: measured under heating at 230° C. and compression at 37.3 N) of the composition of 1 to 14 can be provided. Two embodiments are described in the following.

A first embodiment is now explained.

The thermoplastic polymer (B) of the present invention according to the first embodiment contains two types of thermoplastic acrylic polymers (B1) and (B2).

The thermoplastic acrylic polymer (B1) is obtained by copolymerizing a monomer component containing not less than 95% by weight of a methacrylic acid ester, and not greater than 5% by weight of an acrylic acid ester and/or other copolymerizable vinyl monomer.

The methacrylic acid ester may be similar to the methacrylic acid ester used in the crosslinked acrylic polymer (A-1) described above, and methacrylic acid alkyl esters are preferred. The alkyl preferably has 1 to 4 carbon atoms, and more preferably has 1 carbon atom. The methacrylic acid ester may be used alone, or two or more thereof may be used in combination.

The content of the methacrylic acid ester is not less than 95% by weight, preferably not less than 97% by weight, and more preferably not less than 99% by weight with respect to 100% by weight of the monomer component. As the percentage of the methacrylic acid ester is higher, the Vicat softening temperature becomes higher, whereby deformity upon release after the thermal transfer can be inhibited.

The acrylic acid ester may be similar to the acrylic acid ester used in the crosslinked acrylic polymer (A-1) described above. Of them, in light of improvement of thermal stability via inhibition of depolymerization, acrylic acid alkyl esters are preferred, and the alkyl group preferably has 1 to 8 carbon atoms. The acrylic acid ester may be used alone, or two or more thereof may be used in combination.

Examples of the other copolymerizable vinyl monomer include those similar to the other copolymerizable vinyl monomer which may be used in the monomer component (a-1) described above, and these may be used alone, or two or more thereof may be used in combination.

The total content of the acrylic acid ester and/or the other copolymerizable vinyl monomer is not greater than 5% by weight with respect to 100% by weight of the monomer component. However, in light of improvement of thermal stability due to be capable of inhibiting the depolymerization, the acrylic acid alkyl ester is preferably contained in an amount of not less than 1% by weight.

The thermoplastic acrylic polymer (B1) exhibits a fluidity (MFR: measured under heating at 230° C. and compression at 37.3 N) of not greater than 8, and preferably not greater than 5. Lower fluidity results in an increase of the molecular weight and thus leads to a relative decrease in the number of molecular ends, whereby thermal degradation accompanied by depolymerization can be inhibited. The fluidity of the polymer can be easily controlled by adjusting the monomer type and composition, and the molecular weight thereof.

The thermoplastic acrylic polymer (B2) is obtained by copolymerizing the monomer component containing not less than 92% by weight of a methacrylic acid ester, and not greater than 8% by weight of an acrylic acid ester and/or other copolymerizable vinyl monomer.

The methacrylic acid ester may be similar to the methacrylic acid ester used in the crosslinked acrylic polymer (A-1) described above, and methacrylic acid alkyl esters are preferred. The alkyl group preferably has 1 to 4 carbon atoms, and more preferably 1 carbon atom. The methacrylic acid ester may be used alone or two or more thereof may be used in combination.

The content of the methacrylic acid ester is not less than 92% by weight, preferably not less than 94% by weight, and more preferably not less than 95% by weight with respect to 100% by weight of the monomer component. As the percentage of the methacrylic acid ester is higher, the Vicat softening temperature becomes higher whereby deformity upon release after the thermal transfer can be inhibited.

The acrylic acid ester and the other copolymerizable vinyl monomer may be similar to the acrylic acid ester and the other copolymerizable vinyl monomer which may be used in the thermoplastic acrylic polymer (B1) described above.

The total content of the acrylic acid ester and/or the other copolymerizable vinyl monomer is not greater than 8% by weight with respect to 100% by weight of the monomer component. However, in light of improvement of thermal stability due to be capable of inhibiting the depolymerization, the acrylic acid alkyl ester is preferably contained in an amount of not less than 5% by weight.

The thermoplastic acrylic polymer (B2) exhibits a fluidity (MFR: measured under heating at 230° C. and compression at 37.3 N) of not less than 15, and preferably not less than 20. Higher fluidity enables prism thermal transfer properties to be improved. However, due to an increase in the molecular weight of the polymer, the number of molecular ends relatively increases, and thus thermal degradation accompanied by depolymerization may be likely to proceed. Therefore, it is preferred to use a monomer effective for inhibiting depolymerization (for example, acrylic acid alkyl esters) in an amount of not less than 5% by weight. When the thermal degradation accompanied by depolymerization proceeds, the residual monomer increases, and thus voids are generated due to formation of gas, leading to disadvantages of deterioration of film productivity and film appearance by gum generated.

The thermoplastic acrylic polymer (B1) and the thermoplastic acrylic polymer (B2) are obtained by polymerizing each monomer component. The polymerization method is not particularly limited, and for example, suspension polymerization, emulsion polymerization or bulk polymerization may be employed. A chain transfer agent may be appropriately used. Various types of chain transfer agents which are conventionally known may be used, and particularly mercaptans are preferred. The amount of the chain transfer agent used may be adjusted ad libitum depending on the monomer type and the composition.

According to the first embodiment of the present invention, the thermoplastic acrylic polymer (B1) and the thermoplastic acrylic polymer (B2) are used in combination at a specified ratio, thereby enabling the fluidity exhibited by the composition of the present invention to fall within a certain range, and still further, enabling the Vicat softening temperature and the thermal stability to be readily adjusted.

The weight ratio of the thermoplastic acrylic polymer (B1) to the thermoplastic acrylic polymer (B2), i.e., (B1)/(B2) is 10/90 to 90/10, preferably 20/80 to 80/20, and more preferably 30/70 to 70/30. Since the thermoplastic acrylic polymer (B2) has an extremely high fluidity, expectation to achievement of a lubricating effect is permitted. Therefore, elevation of the flowability of the composition can be realized while maintaining a high Vicat softening temperature.

Next, the second embodiment is explained.

The thermoplastic polymer (B) according to the second embodiment of the present invention is constituted with one type of the thermoplastic acrylic polymer (B3).

The thermoplastic acrylic polymer (B3) is obtained by copolymerizing a monomer component containing not less than 80% by weight of a methacrylic acid ester, and 0 to 20% by weight of an acrylic acid ester and/or other copolymerizable vinyl monomer.

The methacrylic acid ester may be similar to the methacrylic acid ester used in the crosslinked acrylic polymer (A-1) described above, and methacrylic acid alkyl esters are preferred, in which the alkyl more preferably has 1 to 4 carbon atoms. The methacrylic acid ester may be used alone or two or more thereof may be used in combination.

The content of the methacrylic acid ester is not less than 80% by weight, and preferably not less than 85% by weight with respect to 100% by weight of the monomer component. When the content is less than 80% by weight, the solvent resistance may be deteriorated.

The acrylic acid ester may be similar to the acrylic acid ester used in the crosslinked acrylic polymer (A-1) described above. Of them, acrylic acid alkyl esters are preferred, and the alkyl group preferably has 1 to 8 carbon atoms. The acrylic acid ester may be used alone, or two or more thereof may be used in combination.

Examples of the other copolymerizable vinyl monomer include those similar to the other copolymerizable vinyl monomer which may be used in the monomer component (a-1) described above, and these may be used alone, or two or more thereof may be used in combination.

The total content of the acrylic acid ester and/or the other copolymerizable vinyl monomer is 0 to 20% by weight, and preferably 0 to 10% by weight with respect to 100% by weight of the monomer component.

The thermoplastic acrylic polymer (B3) is obtained by polymerizing these monomer components. The polymerization method is not particularly limited, and for example, suspension polymerization, emulsion polymerization or bulk polymerization may be employed.

The reduced viscosity exhibited by the methyl ethyl ketone soluble-matter of the thermoplastic acrylic polymer (B3) is not greater than 0.35 dl/g, preferably not greater than 0.34 dl/g, and more preferably not greater than 0.32 dl/g. The reduced viscosity exceeding 0.35 dl/g is likely to result in deteriorated thermal transfer properties. The method for the determination of the reduced viscosity is similar to the method for the determination of the reduced viscosity in connection with the acrylic polymer (A). In order to adjust the reduced viscosity of a polymer to fall with in the above range, a chain transfer agent may be used during the polymerization. Various types of chain transfer agents which are conventionally known may be used, and particularly mercaptans are preferred. The amount of the chain transfer agent used may be decided ad libitum depending on the monomer type and the composition.

Additives such as an anti-oxidizing agent, an ultraviolet ray absorbing agent and the like may be added alone or in combination of two or more thereof to the composition of the present invention in accordance with the intended purpose of the film in order to increase the stability against heat and light. In addition, a colorant may be also added for the purpose of coloring. Specific examples of the colorant include organic dyes of thioxanthene base, coumarin base, perylene base, methine base, benzopyran base, thioindigo base and anthraquinone base, as well as organic pigments such as phthalocyanine. Still further, a resin other than acrylic resins such as a polycarbonate resin or a polyester resin may be appropriately used in combination.

The composition of the present invention is used as a material of an acrylic film having a prism type retroreflection structure formed on the surface thereof. The film is produced by molding a flat film from the composition, and thereafter thermal transferring a prism type retroreflection structure on one surface of the flat film using a die. The prism type retroreflection structure means a structure in which a large number of micro prisms are formed on the surface of a transparent film, thereby enabling the transparent film to have retroreflective characteristics. The flat film can be molded with, for example, a conventional melt extrusion method, for example, an inflation method, T-die extrusion method or calendaring method.

The film has a thickness at a portion having a maximum thickness, of suitably about 10 to 500 μm, preferably 30 to 300 μm, and even more preferably 75 to 200 μm.

Figure 3:
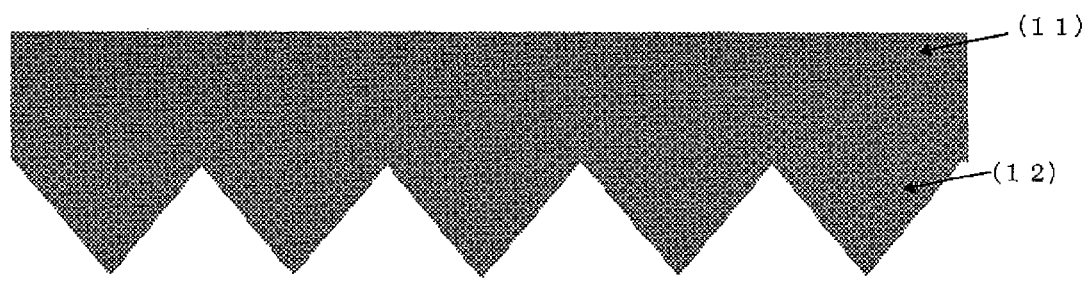
FIG. 3 shows a cross sectional view illustrating an acrylic film having a prism type retroreflection structure formed on one surface thereof by thermal transfer.

The film of the present invention has a prism type retroreflection structure formed on the surface thereof by thermal transfer. The shape of each element in the reflection structure may be exemplified by hemisphere, quadrangular pyramid, triangular pyramid, and the like. In FIG. 3, a cross section of a film on which triangular pyramidal prisms are formed is shown. The height of each element is preferably not greater than 100 μm.

The retroreflection sheet of the present invention is as shown in FIG. 1, a laminated sheet formed by lamination of a surface protective layer 10, a retroreflection layer 11 and a liner film 13. A mid layer may be also provided between the surface protective layer and the retroreflection layer (not shown in the Figure). As the retroreflection layer, an acrylic film having a prism type retroreflection structure 12 formed on the surface thereof described above is used. The surface protective layer 10 is laminated on the surface of the retroreflection layer 11, at the side which had not been provided with the retroreflection structure 12. The liner film 13 is laminated on the surface of the retroreflection layer 11, at the side which had been provided with the retroreflection structure 12. The liner film is in contact with the retroreflection layer 11 by means of a joint part (protruding support) 14, and an air layer 15 is present therebetween at areas other than the joint part. As the surface protective layer 10, a film constituted with an acrylic resin is preferably used in order to improve the weather resistance of the retroreflection sheet.

Figure 2:
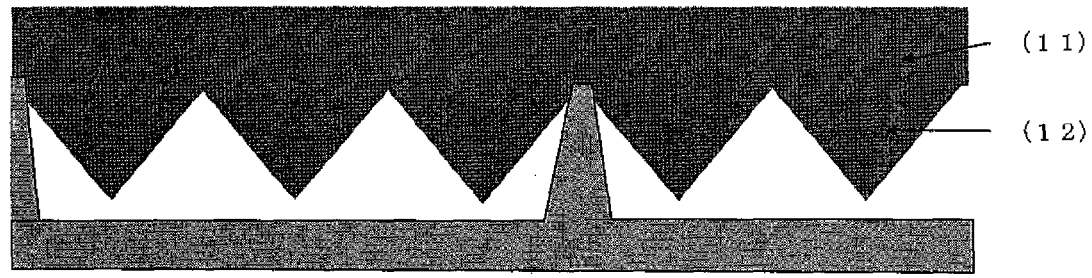
FIG. 2 shows a diagram illustrating a retroreflection sheet not including a surface protective layer.

Since the acrylic film of the present invention is superior in weather resistance per se, a retroreflection sheet having a lamination structure as shown in FIG. 2 can be provided without using the surface protective layer 10, according to the present invention. Since the retroreflection sheet does not include the surface protective layer 10, it can be produced at lower costs as compared with retroreflection sheets having the surface protective layer 10, and in addition, thinning of the thickness of the entire sheet is enabled.

The retroreflective reflection sheet of the present invention can be suitably used for signs such as road traffic signs and construction signs, number plates of vehicles such as automobiles and motorcycles, as well as safety materials such as car crash preventing plates, garments and life-saving devices.

EXAMPLES

Hereinafter, the present invention is explained more specifically by way of Examples and Comparative Examples, but the present invention is not in any how limited thereto. It should be noted that unless particularly stated "part" or "%" each represents "part by weight" or "% by weight" in the following descriptions.

The measurement and the evaluation in Examples and Comparative Examples were carried out with the following conditions and methods.

(1) Polymerization Conversion Rate

The acrylic polymer (A) latex obtained was dried in a hot-air dryer at 120° C. for 1 hour, and the solid content was determined. Then the polymerization conversion rate (%) was calculated in accordance with 100× the solid content/amount of the charged monomer.

(2) Gel Content of Acrylic Resin Composition

The gel content in the acrylic resin composition was determined by multiplying the gel content (%) of the acrylic polymer (A) by the compounding rate of the acrylic polymer (A).

The gel content of the acrylic polymer (A) was determined according to the following formula (1) by: collecting a predetermined amount of dry resin powders of the acrylic polymer (A) on a 100-mesh wire mesh; immersing the same in methyl ethyl ketone for 48 hrs and drying under reduced pressure to remove methyl ethyl ketone; and thereafter recording the weight when the weight became constant even if further dried.

Gel content (%) of the acrylic polymer (A)=(weight after redrying/weight of the collected sample)× 100    (1)

The gel content in the acrylic resin composition (%) was calculated according to the following formula (2), by multiplying the gel content (%) of the acrylic polymer (A) by the compounding rate of the acrylic polymer (A).

Gel content in acrylic resin composition (%)(gel content (%) of the acrylic polymer (A))×(proportion of the acrylic polymer (A))    (2)

(3) Glass Transition Temperature

Calculation was carried out with the formula of Fox using values (MMA; 105° C., BA; −54° C., ST; 100° C.) described in "Polymer Hand Book (J. Brandrup, Interscience, 1989)". Here, the calculation excluded the polyfunctional monomer, the initiator and the surfactant.

(4) Graft Rate

Dry resin powders of the acrylic polymer (A) in an amount of 1 g were dispersed and dissolved in 50 ml of methyl ethyl ketone (MEK), and the insoluble matter and the soluble-matter were separated by a centrifugal separator (30,000 rpm×2 hrs). The insoluble matter was sufficiently dried by vacuum drying, and was weighed as a rubber graft matter, and the graft rate was calculated according to the following formula.

Graft rate (%)=((weight of the rubber graft matter− weight of the crosslinked acrylic polymer (A-1))/ weight of the crosslinked acrylic polymer (A-1))×100

(5) Weight Average Particle Diameter of Acrylic Polymer (A)

Using a latex of the obtained acrylic polymer (A) diluted to give the solid content of 0.02% as a sample, the weight average particle diameter was determined based on the light transmittance at a wavelength of 546 nm using a spectrophotometer (manufactured by HITACHI, Spectrophotometer U-2000) at a temperature of 23° C.±2° C. and a humidity of 50%±5%.

(6) Reduced Viscosity

The methyl ethyl ketone (MEK) soluble-matter was dissolved in N,N'-dimethylformamide to prepare a 0.3% solution in N,N'-dimethylformamide, and the solution was subjected to the measurement at 30° C. The unit is dl/g.

(7) Transparency

In accordance with JIS K7136, a haze meter (HAZE METER) manufactured by NIPPON DENSHOKU INDUSTRIES CO., LTD. was used to measure the total light transmittance and haze of the film having a thickness of 150 μm. The measurement was carried out at 23° C., and the result is shown based on "%" as a unit.

(8) Breakage Resistance

The obtained film was cut to give an incision in an MD direction with a length of 10 cm at 23° C. using a cutter, and the state of breakage at the cut area was evaluated according to the following criteria. The 10-cm incision provided by the cutter was made with a tilting angle of the tip of the cutter blade being 45° with respect to the film over a time period of 2 sec.

A: the size of the breakage at the cut area being less than 1 mm.

B: the size of the breakage at the cut area being 1 to 5 mm.

C: the size of the breakage at the cut area exceeding 5 mm.

(9) Thermal Transfer Property of Prism Type Retroreflection Structure

An acrylic film (transparent, thickness 150 μm) was overlaid on a female die in which the following triangular pyramidal prisms are arranged in the closest packing state (100 mm×100 mm) to carry out thermal transfer, and subjected to a processing so as to provide the film surface with triangular pyramidal prisms as shown in FIG. 3. The thermal pressing was carried out under conditions involving a resin temperature of 230° C. and a pressure of 20 kg/cm² for 2 sec, and the resin temperature was lowered to 50° C. by cooling, followed by slow release of the prism film from the die. The prism film thus obtained was subjected to the measurement of the retroreflection coefficient by the method described in the following (12), and then the thermal transfer property was evaluated according to the criteria below.

A: retroreflection coefficient being not less than 200

C: retroreflection coefficient being less than 200

(10) Die Releasability after Thermal Transfer

An acrylic film (transparent, thickness 150 μm) was overlaid on a female die in which the following triangular pyramidal prisms are arranged in the closest packing state (100 mm×100 mm) to carry out thermal transfer, and subjected to a processing so as to provide the film surface with triangular pyramidal prisms as shown in FIG. 3. The thermal pressing was carried out under conditions involving a resin temperature of 230° C. and a pressure of 20 kgf/cm² for 2 sec, and thereafter the die was cooled to 85° C. The prism film was released from the die at a rate of 200 mm/min while maintaining the die temperature of 85° C. In this procedure, the film was released so as to form a T-shape with respect to the die. The prism film obtained in this manner was subjected to the measurement of the retroreflection coefficient by the method described in the following (12), and then the die releasability was evaluated according to the criteria below.

A: retroreflection coefficient being not less than 150

C: retroreflection coefficient being less than 150

(11) Production of Prism Die

A method for producing the female die is now explained. For forming the triangular pyramidal prism shape of this die, diamond bites (blades) having a tip angle to meet the angle that should be formed by each lateral face and the lower bottom face calculated from each dimension described below were produced, and a copper male die was produced according to the following steps in which a large number of triangular pyramidal prisms of a convex shape having a height of 100 μm were arranged in a closest packed state. Using this copper male die, a nickel female die of a concave shape having a reversed shape was produced by electroforming. Three types of diamond bites having a tip angle of 64.24°, 64.54°, 82.18°, respectively, were provided, and on a 100 mm×100 mm copper plate after cutting to generate a flat surface were formed parallel grooves having a V shaped cross section with a repeated pattern by cutting using a diamond bite having a tip angle of 64.24° so as to give a repeating pitch of 222 μm, and the depth of the groove of 100 μm. Thereafter, parallel grooves having a V shaped cross section with a repeated pattern were formed by cutting using a diamond bite having a tip angle of 64.54° so as to give a repeating pitch of 221 μm, the depth of the groove of 100 μm, and a crossing angle with a side a1 of 66.64°. In addition, parallel grooves having a V shaped cross section with a repeated pattern were formed by cutting using a diamond bite having a tip angle of 82.18° so as to give a repeating pitch of 202 μm, the depth of the groove of 100 μm, a crossing angle with a side a1 of 56.81°, and a crossing angle with a side a3 of 56.56°.

(12) Evaluation of Retroreflective Property

The retroreflective property was evaluated according to the following conditions using the prism film thus obtained.

Figure 4:
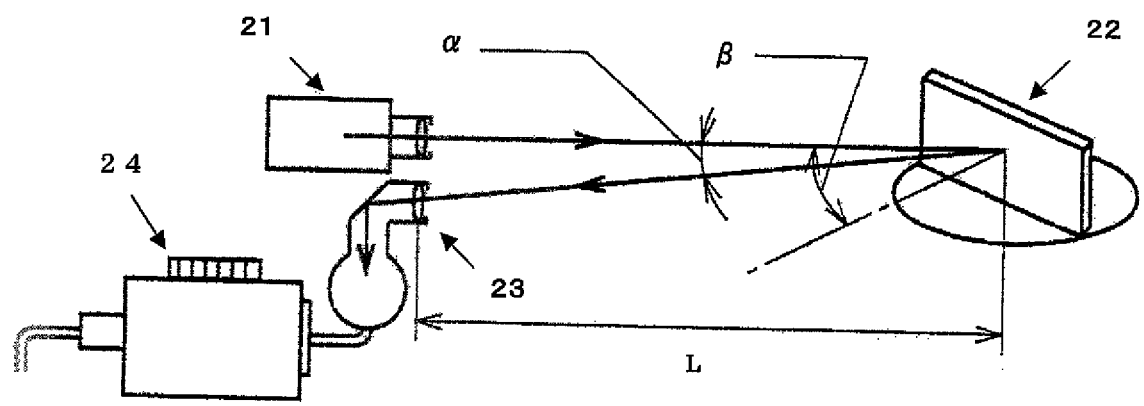
FIG. 4 shows a schematic diagram illustrating a method for measuring a retroreflective reflection coefficient in accordance with JIS Z8714.

In accordance with JIS Z8714, each test item was measured with the arrangement shown in FIG. 4, and the retroreflection coefficient (unit: Cd/Lx·m²) was calculated according to the formula (1) and the formula (2).

$$I = Er*L^2 \quad (1)$$

$$R' = I/(En*A) \quad (2)$$

R': retroreflection coefficient

I: luminosity (unit: Cd) of the sample observed from the light-receiving position Er: illuminance (unit: Lx) on the optical receiver in the configuration shown in FIG. 4 (angle of incidence α: −4°, observation angle β: 0.2°

En: illuminance (unit: Lx) at the center position of the sample on the plane that is perpendicular to the incoming beam L: distance (unit: m) between the surface center of the sample and the optical receiver A: area of the surface of the sample (unit: m²)

(13) Fluidity (MFR)

A certain amount of the synthesized resin was compressed in a cylindrical vessel which had been heated with heater at 230° C. and pressured at 37.3 N, and the amount of the resin extruded from the opening (nozzle) attached to the bottom of the vessel in 10 min was measured. The value was expressed by a unit of g/10 min, and when the resin did not flow, a denotation of "C" was given. The test machine employed was an extrusion type plastometer defined in JIS K6760, and the measuring method was pursuant to JIS K7210. The measurement machine was Shimadzu Flow Tester, model number: CFT-500C manufactured by Shimadzu Corporation, and the amount of the measurement was 1.4 g. A resin of 1.4 g was first used as a washing resin.

(14) Vicat Softening Temperature

In accordance with JIS K7206, a test piece having a dimension as defined was placed in a heating bath, and the temperature of the bath was elevated while the end face of a having a specified cross sectional area (1 mm²) was pressed against the central region at a load of 5 kgf/cm². The Vicut softening temperature (unit: ° C.) was determined in terms of the temperature at which the end face penetrated into the test piece to a depth of 1 mm. The measuring machine employed was manufactured by Toyo Seiki Seisaku-sho, Ltd., model number: S-6M. In each of Examples and Comparative Examples, the polymer, the ultraviolet ray absorbing agent, and the antioxidant were each blended, and extruded and pelletized with a vent type extruder at a present temperature of 240° C. The pellet was pressed at 230° C. to obtain a film having a thickness of 3 mm provided as each test piece.

(15) Solvent Resistance

The film obtained was cut into a strip having a width of 10 mm and a length of 100 mm, to which a 2.3 g of a weight was hanged. The film was immersed in toluene, and a time period passed until the film is cut was measured. The measurement is denoted by a unit of second.

(16) Flex Whitening Resistance

The film obtained was folded 180 degrees once at 23° C., and the change of the folded area was evaluated visually according to the following criteria.

A: breakage (whitening) not found.

C: breakage (whitening) found.

(17) Film Formability

A film having a thickness of 150 was extruded by a T die extrusion molding method, and evaluated according to the following criteria.

A: film cleavage being not present, and the thickness being uniform, with stable extrusion being enabled.

C: film cleavage being present, and the extrusion being unstable.

(18) Surface Property

The surface of the film obtained was evaluated by visual inspection according to the following criteria.

A: fish eye, burn mark, and foreign substance being hardly observed.

C: any of fish eye, burn mark, and foreign substance being observed, with the surface being nonuniform.

Synthesis Example 1

Synthesis of Acrylic Polymer (A): P-1

Into a 8-liter polymerization vessel equipped with a stirrer, a thermometer, a nitrogen gas inlet tube, a monomer supplying tube, and a reflux condenser were charged 200 parts by weight of water and OSA in compounding amounts shown in Table 1. The vessel was purged with nitrogen gas for sufficient replacement thereby to provide a substantially oxygen-free state. Thereafter, the internal temperature was adjusted to 40° C., and thereto were added batchwise 5 parts by weight of a mixture (a-1-1) shown in Table 1. After the mixture was stirred for 10 min, the following substances, i.e., sodium formaldehydesulfoxylate: 0.11 parts by weight;
ferrous sulphate dihydrate: 0.004 parts by weight; and
ethylene diamine tetraacetic acid-2-sodium: 0.001 parts by weight were charged. Further, a mixture (a-1-2) shown in Table 1 was continuously added at a rate of 10 parts by weight/hour to allow for polymerization. Thereafter, the polymerization was further continued for additional 0.5 hrs. Next, a mixture (a-1-3) shown in Table 1 was continuously added at a rate of 12.7 parts by weight/hour to allow for polymerization. Thereafter, the polymerization was further continued for additional 1.0 hour. With the polymerization conversion rate of no less than 92% at the internal temperature adjusted to 60° C., a mixture (a-2-1) shown in Table 1 was continuously added thereto at a rate of 16.7 parts by weight/hour to allow for polymerization, and then the polymerization was further continued for additional 1.0 hour. The polymerization was completed with the polymerization conversion rate of no less than 98% to obtain a latex of the acrylic polymer (A).

The latex thus obtained was subjected to salt precipitation with calcium chloride, followed by washing with water and drying to give dry powders (P-1) of the acrylic polymer (A).

Synthesis Example 2

Synthesis of Acrylic Polymer (A): P-2

Into a 8-liter polymerization vessel equipped with a stirrer, a thermometer, a nitrogen gas inlet tube, a monomer supplying tube, and a reflux condenser were charged the following substances, i.e., water: 200 parts by weight;
sodium formaldehydesulfoxylate: 0.15 parts by weight;
ferrous sulphate dihydrate: 0.006 parts by weight; and
ethylene diamine tetraacetic acid-2-sodium: 0.0015 parts by weight, with OSA at each compounding rate shown in Table 1. The vessel was purged with nitrogen gas for sufficient replacement thereby to provide a substantially oxygen-free state. Thereafter, the internal temperature was adjusted to 60° C., and thereto was continuously added a mixture (a-1-1) shown in Table 1 at a rate of 12.0 parts by weight/hour to allow for polymerization. With the polymerization conversion rate of no less than 90%, the polymerization was further continued for additional 0.5 hrs. A mixture (a-2-1) shown in Table 1 was continuously added thereto at a rate of 15.6 parts by weight/hour to allow for polymerization. After the polymerization was further continued for additional 1.0 hour, the polymerization was completed with the polymerization conversion rate of no less than 98% to obtain a latex.

The latex thus obtained was subjected to salt precipitation with calcium chloride, followed by washing with water and drying to give dry powders (P-2) of the acrylic polymer (A).

Synthesis Examples 3 to 7

Synthesis of Acrylic Polymers (A): P-3 to P-7

Dry powders (P-3) to (P-7) of the acrylic polymers (A) were obtained in a similar manner to Synthesis Example 2 except that the mixture (a-1-1), the mixture (a-2-1) and the compounding amount of these in Synthesis Example 2 were changed as shown in Table 1.

TABLE 1

| | | | | Synthesis Example | | | | | | |
|---|---|---|---|---|---|---|---|---|---|---|
| | | | | P-1 | P-2 | P-3 | P-4 | P-5 | P-6 | P-7 |
| OSA (part) | | | | 0.12 | 0.28 | | 0.28 | | 0.01 | 0.28 |
| Acrylic polymer (A) | Crosslinked acrylic polymer (A-1) | Mixture (a-1-1) | part | 5 | 30 | | | 30 | | |
| | | | MMA (%) | 40 | 10 | 10 | 50 | | 10 | |
| | | | BA (%) | 60 | 90 | 90 | 50 | | 90 | |
| | | | AMA (part) | 0.02 | 0.36 | 2.4 | | 0.36 | | 0 |
| | | | CHP (part) | 0.005 | 0.06 | | | 0.06 | | |
| | | | OSA (part) | — | 0.33 | | | 0.33 | | |
| | | Mixture (a-1-2) | part | 10 | | | | — | | |
| | | | MMA (%) | 26 | | | | | | |
| | | | BA (%) | 54 | | | | | | |
| | | | ST (%) | 20 | | | | | | |
| | | | AMA (part) | 0.06 | | | | | | |
| | | | CHP (part) | 0.04 | | | | | | |
| | | | OSA (part) | 0.2 | | | | | | |
| | | Mixture (a-1-3) | part | 35 | | | | — | | |
| | | | MMA (%) | 20 | | | | | | |
| | | | BA (%) | 80 | | | | | | |
| | | | AMA (part) | 0.5 | | | | | | |
| | | | CHP (part) | 0.15 | | | | | | |
| | | | OSA (part) | 0.2 | | | | | | |
| | Monomer component (a-2) | Mixture (a-2-1) | part | 50 | 70 | | | 70 | | |
| | | | MMA (%) | 92 | 90 | | | 90 | | |
| | | | BA (%) | 8 | 10 | | | 10 | | |
| | | | tDM (part) | 0.23 | 0.3 | 0.3 | | 0.1 | | 0.3 |
| | | | CHP (part) | 0.2 | 0.3 | 0.3 | | 0.1 | | 0.3 |

TABLE 1-continued

|  | Synthesis Example | | | | | | |
|---|---|---|---|---|---|---|---|
|  | P-1 | P-2 | P-3 | P-4 | P-5 | P-6 | P-7 |
| Weight average particle diameter (Å) | 1500 | 800 | 800 | | | 4500 | — |
| Glass transition temperature in each layer (mixture (a-1-1)/(a-1-2)/(a-1-3)) (Tg (° C.)) | −10/−2/−34 | −44/—/— | −44/—/— | 4/—/— | | −44/—/— | |
| Reduced viscosity dl/g | 0.23 | 0.31 | 0.31 | 0.30 | 0.40 | 0.31 | 0.34 |
| Graft rate (%) | 70 | 100 | 150 | | 100 | | 0 |
| Gel content % | 85 | 60 | 75 | | 60 | | 0 |

Each abbreviation in Table indicates the following each substance.
OSA: sodium dioctylsulfosuccinate
BA: butyl acrylate
MMA: methyl methacrylate
ST: styrene
CHP: cumenehydroperoxide
AMA: allyl methacrylate
tDM: tertiary dodecyl mercaptan Examples 1 to 11, and Comparative Examples 1 to 7

Dry powders P-1 to −7 as the acrylic polymer (A), and the thermoplastic polymer (B) were blended at each compounding rate shown in Tables 2 and 3. Subsequently, 1 part of an ultraviolet ray absorbing agent: TINUVIN234 (manufactured by Ciba Specialty Chemicals plc.), and 0.4 parts of an antioxidant: AO60 (manufactured by ADEKA CORPORATION) with respect to 100 parts in total of the acrylic polymer (A) and the thermoplastic polymer (B) were blended. The mixture thus obtained was extruded with a vent type extruder at a preset temperature of 240° C. to permit pelletization, followed by additional extrusion with a T die extruder at a preset temperature of 220° C., with a die temperature of 240° C. to produce a film (thickness: 150 μm). Various physical properties of the resultant film were evaluated according to the aforementioned method. The results are shown in Tables 2 and 3.

TABLE 2

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Acrylic resin composition | Acrylic polymer (A) | P-1 | 50 | 50 | 50 | 50 | 30 | | | 50 | 50 | 50 | 50 |
| | | P-2 | | | | | | 50 | | | | | |
| | | P-3 | | | | | | | | | | | |
| | | P-4 | | | | | | | 50 | | | | |
| | | P-5 | | | | | | | | | | | |
| | | P-6 | | | | | | | | | | | |
| | | P-7 | | | | | | | | | | | |
| | Thermoplastic polymer (B1) | Methacrylic resin (B1-1: MMA = 95%, MFR = 1.5) | 25 | | | | | | | | 25 | | |
| | | Methacrylic resin (B1-2: MMA = 99%, MFR = 2) | | 25 | 40 | 10 | 35 | 25 | 25 | | | | 25 |
| | Thermoplastic polymer (B2) | Methacrylic resin (B2-1: MMA = 91%, MFR = 35) | | | | | | | | 50 | 25 | 25 | |
| | | Methacrylic resin (B2-2: MMA = 94%, MFR = 21) | 25 | 25 | 10 | 40 | 35 | 25 | 25 | | 50 | | |
| | Gel content in acrylic resin composition (%) | | 42.5 | 42.5 | 42.5 | 42.5 | 25.5 | 30 | 30 | 42.5 | 42.5 | 42.5 | 42.5 |
| | MFR of acrylic resin composition (g/10 min) | | 5 | 5 | 3 | 6 | 10 | 6 | 7 | 7 | 6 | 5 | 5 |
| | Vicat of acrylic resin composition (° C.) | | 86 | 88 | 90 | 85 | 92 | 89 | 92 | 75 | 81 | 81 | 83 |
| Physical properties of film | Transparency | Total light transmittance (%) | 92 | 93 | 92 | 91 | 93 | 93 | 85 | 93 | 92 | 91 | 93 |
| | | Haze (%) | 0.9 | 0.9 | 1.0 | 0.9 | 0.9 | 0.9 | 2 | 0.9 | 0.9 | 1.0 | 0.9 |
| | Prism formability | Prism thermal transfer property | A | A | A | A | A | A | A | A | A | A | A |
| | | Die releasability at 85° C. | A | A | A | A | A | A | A | C | C | C | C |
| | Breakage resistance | | A | A | A | A | A | A | B | A | A | A | A |

TABLE 3

| | | | Comparative Example | | | | | | |
|---|---|---|---|---|---|---|---|---|---|
| | | | 1 | 2 | 3 | 4 | 5 | 6 | 7 |
| Acrylic resin composition | Acrylic polymer (A) | P-1 | 50 | 50 | 70 | | | | |
| | | P-2 | | | | | | | |
| | | P-3 | | | | 50 | | | |
| | | P-4 | | | | | | | |
| | | P-5 | | | | | 50 | | |
| | | P-6 | | | | | | 50 | |
| | | P-7 | | | | | | | 50 |
| | Thermoplastic polymer (B1) | Methacrylic resin (B1-1: MMA = 95%, MFR = 1.5) | 50 | | | | | | |

TABLE 3-continued

|  |  |  | Comparative Example | | | | | | |
|---|---|---|---|---|---|---|---|---|---|
|  |  |  | 1 | 2 | 3 | 4 | 5 | 6 | 7 |
|  |  | Methacrylic resin (B1-2: MMA = 99%, MFR = 2) |  | 50 | 15 | 25 | 25 | 25 | 25 |
|  | Thermoplastic polymer (B2) | Methacrylic resin (B2-1: MMA = 91%, MFR = 35) |  |  |  |  |  |  |  |
|  |  | Methacrylic resin (B2-2: MMA = 94%, MFR = 21) |  |  | 15 | 25 | 25 | 25 | 25 |
|  | Gel content in acrylic resin composition (%) |  | 42.5 | 42.5 | 51 | 37.5 | 30 | 30 | 0 |
|  | MFR of acrylic resin composition (g/10 min) |  | C | C | C | C | C | C | 15 |
|  | Vicat of acrylic resin composition (° C.) |  | 93 | 95 | 80 | 90 | 89 | 84 | 84 |
| Physical properties of film | Transparency | Total light transmittance (%) | 92 | 92 | 93 | 91 | 91 | 78 | 77 |
|  |  | Haze (%) | 1.0 | 1.0 | 1.0 | 1.2 | 1.2 | 3.9 | 4 |
|  | Prism formability | Prism thermal transfer property | C | C | C | C | C | C | C |
|  |  | Die releasability at 85° C. | A | A | C | A | A | C | C |
|  | Breakage resistance |  | A | A | A | A | A | A | C |

In Tables 2 and 3, the methacrylic resins (B1-1), (B1-2), (B2-1), and (B2-2) blended as the thermoplastic polymer (B) indicate the following resins, respectively.

Methacrylic resin (B1-1): SUMIPEX EX-A (manufactured by Sumitomo Chemical Co., Ltd., MMA/MA=95/5, MFR=1.5 g/10 min (at 230° C., 37.3 N))

Methacrylic resin (B1-2): Parabeads HR-L (manufactured by Kuraray Co., Ltd., MMA/MA=99/1, MFR=2 g/10 min (at 230° C., 37.3 N))

Methacrylic resin (B2-1): SUMIPEX LG35 (manufactured by Sumitomo Chemical Co., Ltd., MMA/MA=91/9, MFR=35 g/10 min (at 230° C., 37.3 N))

Methacrylic resin (B2-2): SUMIPEX LG21 (manufactured by Sumitomo Chemical Co., Ltd., MMA/MA=94/6, MFR=21 g/10 min (at 230° C., 37.3 N))

As shown in Tables 2 and 3, the films obtained in Examples are superior in transparency and excellent in thermal transfer properties of the prism type retroreflection structure, and also favorable in breakage resistance. Therefore, it is clear that the film of the present invention is suited for retroreflection sheets. Moreover, the films of Examples 1 to 7 are also superior in the die releasability after the thermal transfer, thereby leading to favorable productivity.

Synthesis Example 8

Synthesis of Acrylic Polymer (A): P-8

Into a 8-liter polymerization vessel equipped with a stirrer, a thermometer, a nitrogen gas inlet tube, a monomer supplying tube, and a reflux condenser were charged 200 parts by weight of water and OSA in compounding amounts shown in Table 4. The vessel was purged with nitrogen gas for sufficient replacement thereby to provide a substantially oxygen-free state. Thereafter, the internal temperature was adjusted to 40° C., and thereto were added batchwise 5 parts by weight of a mixture (a-1-1) shown in Table 4. After the mixture was stirred for 10 min, the following substances, i.e., sodium formaldehydesulfoxylate: 0.11 parts by weight;
ferrous sulphate dihydrate: 0.004 parts by weight; and
ethylene diamine tetraacetic acid-2-sodium: 0.001 parts by weight were charged. Further, a mixture (a-1-2) shown in Table 4 was continuously added at a rate of 10 parts by weight/hour to allow for polymerization. Thereafter, the polymerization was further continued for additional 0.5 hrs. Next, a mixture (a-1-3) shown in Table 4 was continuously added at a rate of 12.7 parts by weight/hour to allow for polymerization. Thereafter, the polymerization was further continued for additional 1.0 hour. With the polymerization conversion rate of no less than 98% at the internal temperature adjusted to 60° C., a mixture (a-2-1) shown in Table 4 was continuously added thereto at a rate of 16.7 parts by weight/hour to allow for polymerization, and then the polymerization was further continued for additional 1.0 hour. The polymerization was completed with the polymerization conversion rate of no less than 98% to obtain a latex of the acrylic polymer (A).

The latex thus obtained was subjected to salt precipitation with calcium chloride, followed by washing with water and drying to give dry powders (P-8) of the acrylic polymer (A).

Synthesis Example 9

Synthesis of Acrylic Polymers (A): P-10 to P-11

Dry powders (P-10) to (P-11) of the acrylic polymers (A) were obtained in a similar manner to Synthesis Example 8 except that the mixtures (a-1-1) to (a-2-1) and the compounding amount of these in Synthesis Example 8 were changed as shown in Table 4.

Synthesis Example 10

Synthesis of Acrylic Polymer (A): P-9

Into a 8-liter polymerization vessel equipped with a stirrer, a thermometer, a nitrogen gas inlet tube, a monomer supplying tube, and a reflux condenser were charged the following substances, i.e., water: 200 parts by weight;
sodium formaldehydesulfoxylate: 0.15 parts by weight;
ferrous sulphate dihydrate: 0.006 parts by weight; and
ethylene diamine tetraacetic acid-2-sodium: 0.0015 parts by weight, with OSA at each compounding rate shown in Table 4. The vessel was purged with nitrogen gas for sufficient replacement thereby to provide a substantially oxygen-free state. Thereafter, the internal temperature was adjusted to 60° C., and thereto was continuously added a mixture (a-1-1) shown in Table 4 at a rate of 12.0 parts by weight/hour to allow for polymerization. With the polymerization conversion rate of no less than 98%, the polymerization was further continued for additional 0.5 hrs. A mixture (a-2-1) shown in Table 4 was continuously added thereto at a rate of 15.6 parts by weight/hour to allow for polymerization. After the polymerization was further continued for additional 1.0 hour, the polymerization was completed with the polymerization conversion rate of no less than 98% to obtain a latex.

The latex thus obtained was subjected to salt precipitation with calcium chloride, followed by washing with water and drying to give dry powders (P-9) of the acrylic polymer (A).

Synthesis Example 11

Synthesis of Acrylic Polymers (A): P-12 to P-16

Dry powders (P-12) to (P-16) of the acrylic polymers (A) were obtained in a similar manner to Synthesis Example 10 except that the mixture (a-1-1), the mixture (a-2-1) and the compounding amount of these in Synthesis Example 10 were changed as shown in Table 4.

Each abbreviation shown in Table 4 is similar to each in Table 1.

Examples 12 to 18, and Comparative Examples 9 to 21

Dry powders of P-8 to −16 as the acrylic polymer (A), and the thermoplastic polymer (B) were blended at each compounding rate shown in Tables 5 and 6. Thereafter, 1 part of an ultraviolet ray absorbing agent: TINUVIN234 (manufactured by Ciba Specialty Chemicals plc.), and 0.4 parts of an antioxidant: AO60 (manufactured by ADEKA CORPORATION) with respect to 100 parts by weight in total of the acrylic polymer (A) and the thermoplastic polymer (B) were further blended. The mixture thus obtained was extruded with a vent type extruder at a preset temperature of 210° C. to permit pelletization, followed by additional extrusion with a T die extruder at a preset temperature of 210° C., with a die temperature of 240° C. to produce a film (thickness: 150 μm). Various physical properties of the resultant film were evaluated according to the aforementioned method. The results are shown in Tables 5 and 6.

TABLE 4

| | | | | | Synthesis Example | | | | | | | |
|---|---|---|---|---|---|---|---|---|---|---|---|---|
| | | | | | P-8 | P-9 | P-10 | P-11 | P-12 | P-13 | P-14 | P-15 | P-16 |
| OSA (part) | | | | | 0.12 | 0.28 | 0.12 | | 0.28 | | | 0.01 | 0.28 |
| Acrylic polymer (A) | Crosslinked acrylic polymer (A-1) | Mixture (a-1-1) | part | | 5 | 30 | 5 | | | | 30 | | |
| | | | MMA (%) | | 40 | 10 | 40 | 10 | 50 | | 10 | | |
| | | | BA (%) | | 60 | 90 | 60 | 90 | 50 | | 90 | | |
| | | | AMA (part) | | 0.5 | 1.2 | 2.5 | 0.1 | 2.4 | | 1.2 | | 0 |
| | | | CHP (part) | | 0.075 | 0.06 | 0.075 | | | | 0.06 | | |
| | | | OSA (part) | | — | 0.33 | — | | | | 0.33 | | |
| | | Mixture (a-1-2) | part | | 10 | — | 10 | | | | — | | |
| | | | MMA (%) | | 30 | | 30 | | | | | | |
| | | | BA (%) | | 50 | | 50 | | | | | | |
| | | | ST (%) | | 20 | | 20 | | | | | | |
| | | | AMA (part) | | 0.5 | | 2.5 | 0.1 | | | | | |
| | | | CHP (part) | | 0.06 | | 0.06 | | | | | | |
| | | | OSA (part) | | 0.2 | | 0.2 | | | | | | |
| | | Mixture (a-1-3) | part | | 35 | — | 35 | | | | — | | |
| | | | MMA (%) | | 20 | | 80 | | | | | | |
| | | | BA (%) | | 80 | | 20 | | | | | | |
| | | | AMA (part) | | 1.5 | | 2.5 | 0.1 | | | | | |
| | | | CHP (part) | | 0.225 | | 0.225 | | | | | | |
| | | | OSA (part) | | 0.2 | | 0.2 | | | | | | |
| | Monomer component (a-2) | Mixture (a-2-1) | part | | 50 | 70 | 50 | | | | 70 | | |
| | | | MMA (%) | | 92 | 90 | 92 | | | | 90 | | |
| | | | BA (%) | | 8 | 10 | 8 | | | | 10 | | |
| | | | tDM (part) | | 0.46 | 0.43 | 0.46 | | 0.43 | | 0.1 | 0.43 | |
| | | | CHP (part) | | 0.3 | 0.3 | 0.3 | | 0.3 | | 0.1 | 0.3 | |
| | Weight average particle diameter (Å) | | | | 1500 | 800 | 1500 | | 800 | | | 4500 | — |
| | Glass transition temperature in each layer (mixture (a-1-1)/(a-1-2)/(a-1-3)) (Tg (° C.)) | | | | −10/−2/−38 | −44/—/— | −10/−2/−38 | | −44/—/— | 4/—/— | | −44/—/— | |
| | Reduced viscosity dl/g | | | | 0.23 | 0.31 | 0.24 | 0.22 | 0.31 | 0.30 | 0.40 | 0.31 | 0.34 |
| | Graft rate (%) | | | | 70 | 100 | 90 | 40 | 150 | | 100 | | 0 |
| | Gel content % | | | | 85 | 60 | 95 | 70 | 75 | | 60 | | 0 |

TABLE 5

| | | | Example | | | | | | |
|---|---|---|---|---|---|---|---|---|---|
| | | | 12 | 13 | 14 | 15 | 16 | 17 | 18 |
| Acrylic resin composition | Acrylic polymer (A) | | | P-8 | | | P-9 | | |
| | Thermoplastic polymer (B) | Methacrylic resin (B3-1) | | | | | | | |
| | | Methacrylic resin (B3-2) | A | | | A | | | A |
| | | Methacrylic resin (B3-3) | | A | | | A | | |
| | | Methacrylic resin (B3-4) | | | A | | | A | |
| | | Reduced viscosity dl/g | 0.29 | 0.28 | 0.32 | 0.29 | 0.28 | 0.32 | 0.29 |
| | Acrylic polymer (A)/ thermoplastic polymer (B) | | | 50/50 | | | 60/40 | | 50/50 |
| | Gel content in acrylic resin composition (%) | | | 42.5 | | | 36 | | 30 |
| Physical properties of film | Transparency | Total light transmittance (%) | 92 | 92 | 93 | 91 | 92 | 93 | 93 |
| | | Haze (%) | 1.0 | 1.0 | 0.9 | 1.0 | 0.9 | 0.9 | 0.9 |
| | Solvent resistance (sec) | | 160 | 150 | 170 | 230 | 190 | 180 | 200 |
| | Prism thermal transfer property | | 150 | 160 | 200 | 200 | 220 | 280 | 250 |
| | Breakage resistance | | A | A | A | A | A | A | A |
| | Flex whitening resistance | | A | A | A | A | A | A | A |
| | Film formability | | A | A | A | A | A | A | A |
| | Surface property (fish eye) | | A | A | A | A | A | A | A |

TABLE 6

| | | | Comparative Example | | | | | | | | | | | | |
|---|---|---|---|---|---|---|---|---|---|---|---|---|---|---|---|
| | | | 9 | 10 | 11 | 12 | 13 | 14 | 15 | 16 | 17 | 18 | 19 | 20 | 21 |
| Acrylic resin composition | Acrylic polymer (A) | | | P-8 | | P-10 | | P-11 | | | P-12 | P-13 | P-14 | P-15 | P-16 |
| | Thermoplastic polymer (B) | Methacrylic resin (B3-1) | A | | | | | A | | | | | | | |
| | | Methacrylic resin (B3-2) | | | A | | | | | | | A | | | |
| | | Methacrylic resin (B3-3) | | | | | | | | | | | | | |
| | | Methacrylic resin (B3-4) | | | | | | | | | | | | | |
| | | Reduced viscosity dl/g | 0.42 | | 0.29 | | 0.42 | | | | | 0.29 | | | |
| | Acrylic polymer (A)/ thermoplastic polymer (B) | | 50/50 | 25/75 | 70/30 | | 50/50 | 60/40 | 30/70 | 90/10 | | | 60/40 | | |
| | Gel content in acrylic resin composition (%) | | 43 | 21 | 60 | 48 | 35 | 36 | 18 | 54 | 45 | | 36 | | 0 |
| Physical properties of film | Transparency | Total light transmittance (%) | 91 | 93 | 90 | 90 | 85 | 91 | 91 | 90 | 90 | 85 | 91 | 78 | 77 |
| | | Haze (%) | 1.1 | 0.9 | 1.2 | 1.1 | 2.0 | 1.0 | 1.1 | 1.2 | 1.1 | 2.0 | 1.2 | 3.9 | 4.0 |
| | Solvent resistance (sec) | | 170 | 250 | 60 | 230 | 40 | 200 | 190 | 75 | 190 | 90 | 180 | 190 | 30 |
| | Prism thermal transfer property | | 10 | 150 | 2 | 3 | 80 | 25 | 210 | 25 | 80 | 90 | 10 | 5 | 20 |
| | Breakage resistance | | A | C | A | C | A | A | C | A | A | C | A | A | C |
| | Flex whitening resistance | | A | C | A | C | A | A | C | A | A | C | A | A | C |
| | Film formability | | A | A | C | A | C | A | A | A | A | A | A | C | C |
| | Surface property (fish eye) | | A | A | C | A | A | A | A | A | A | A | A | C | C |

The methacrylic resins (B3-1) to (B3-4) blended as the thermoplastic polymer (B) shown in Tables 5 and 6 indicate the following resins, respectively.

Methacrylic resin (B3-1): SUMIPEX EX-A (manufactured by Sumitomo Chemical Co., Ltd., MMA/MA=95/5)

Methacrylic resin (B3-2): SUMIPEX LG6-A (manufactured by Sumitomo Chemical Co., Ltd., MMA/MA=94/6)

Methacrylic resin (B3-3): SUMIPEX LG21 (manufactured by Sumitomo Chemical Co., Ltd., MMA/MA=94/6)

Methacrylic resin (B3-4): SUMIPEX LG35 (manufactured by Sumitomo Chemical Co., Ltd., MMA/MA=91/9)

As is shown in Tables 5 and 6, the films obtained in Examples are superior in film processability such as flex whitening resistance and breakage resistance, as well as transparency, solvent resistance, and film formability, and are also excellent in thermal transfer properties of prism type retroreflection structures. Therefore, it is clear that the acrylic film of the present invention is suited for retroreflection sheets.

EXPLANATION OF THE REFERENCE SYMBOLS

10: surface protective layer

11: retroreflection layer (triangular pyramidal prism layer)

12: prism type retroreflection structure

13: liner film

14: joint part (protruding support)

15: air layer

21: light source

22: retroreflector sample (retroreflection sheet)

23: light-receiving opening

24: spectrophotometer

α: observation angle

β: irradiation angle (angle of incidence)

L: observing distance

The invention claimed is:

1. An acrylic film, which was obtained from a composition comprising:
   (A) an acrylic polymer produced by polymerizing (a-2) a monomer component in the presence of (A-1) a crosslinked acrylic polymer; and (B) a thermoplastic acrylic polymer,
   the composition having a fluidity (MFR: measured under heating at 230° C. and compression at 37.3 N) of 1 to 14, and
   the composition having a gel content of 25 to 50% by weight with respect to 100% by weight in total of the acrylic polymer (A) and the thermoplastic acrylic polymer (B);
   the film having a prism type retroreflection structure formed on the surface thereof.

2. The acrylic film according to claim 1, wherein
   the acrylic polymer (A) is produced by polymerizing the monomer component (a-2) comprising not less than 80% by weight of a methacrylic acid ester, and 20 to 0% by weight of at least one selected from an acrylic acid ester and other copolymerizable vinyl monomer, in the presence of the crosslinked acrylic polymer (A-1);
   the acrylic polymer (A) is in a particulate form having a weight average particle diameter of 300 to 3,000 Å;
   the acrylic polymer (A) has a reduced viscosity (as measured with a 0.3% solution in N,N'-dimethylformamide at 30° C.) of methyl ethyl ketone (MEK) soluble-matter being not greater than 0.35 dl/g; and
   the crosslinked acrylic polymer (A-1) is produced by copolymerizing a monomer component (a-1) comprising an acrylic monomer and a polyfunctional monomer having two or more nonconjugated double bonds per molecule and being capable of copolymerizing with the acrylic monomer, and has a single-layer or multilayer structure.

3. The acrylic film according to claim 2, wherein the monomer component (a-1) comprises the polyfunctional monomer in an amount of 0.2 to 2 parts by weight with respect to 100 parts by weight of the monomer(s) other than the polyfunctional monomer.

4. The acrylic film according to claim 2 wherein the graft rate of the monomer component (a-2) to the crosslinked acrylic polymer (A-1) is 50 to 140% by weight.

5. The acrylic film according to claim 2, wherein each layer constituting the crosslinked acrylic polymer (A-1) has a glass transition temperature of less than 0° C.

6. The acrylic film according to claim 1, wherein the thermoplastic acrylic polymer (B) comprises
   (B1) a thermoplastic acrylic polymer that is produced by copolymerizing a monomer component comprising not less than 95% by weight of a methacrylic acid ester and not greater than 5% by weight of at least one selected from an acrylic acid ester and other copolymerizable vinyl monomer, and exhibits a fluidity of not greater than 8 (MFR: measured under heating at 230° C. and compression at 37.3 N), and
   (B2) a thermoplastic acrylic polymer that is produced by copolymerizing a monomer component comprising not less than 92% by weight of a methacrylic acid ester and not greater than 8% by weight of at least one selected from an acrylic acid ester and other copolymerizable vinyl monomer, and exhibits a fluidity of not less than 15 (MFR: measured under heating at 230° C. and compression at 37.3 N),
   wherein the weight ratio of the (B1)/(B2) is 10/90 to 90/10.

7. The acrylic film according to claim 1, wherein the thermoplastic acrylic polymer (B) is (B3) a thermoplastic acrylic polymer that is produced by copolymerizing a monomer component comprising not less than 80% by weight of a methacrylic acid ester and 0 to 20% by weight of at least one selected from an acrylic acid ester and other copolymerizable vinyl monomer, and has a reduced viscosity of not greater than 0.35 dl/g (as measured with a 0.3% solution in N,N'-dimethylformamide at 30° C.).

8. The acrylic film according to claim 1, wherein the composition has a Vicat softening temperature of not less than 85° C.

9. An acrylic film, which was obtained from a composition comprising the following acrylic polymer (A), the following thermoplastic acrylic polymer (B1) and the following thermoplastic acrylic polymer (B2),
   the weight ratio of the (B1)/(B2) being 10/90 to 90/10, and
   the gel content being 25 to 50% by weight with respect to 100% by weight in total of the acrylic polymer (A), the thermoplastic acrylic polymer (B1) and the thermoplastic acrylic polymer (B2),
   acrylic polymer (A):
   being produced by polymerizing a monomer component (a-2) comprising not less than 80% by weight of a methacrylic acid ester, and 20 to 0% by weight of at least one selected from an acrylic acid ester and other copolymerizable vinyl monomer, in the presence of a crosslinked acrylic polymer (A-1),
   being in a particulate form having a weight average particle diameter of 300 to 3,000 Å, and
   having a reduced viscosity (as measured with a 0.3% solution in N,N'-dimethylformamide at 30° C.) of methyl ethyl ketone (MEK) soluble-matter being not greater than 0.35 dl/g,
   wherein, the crosslinked acrylic polymer (A-1) is produced by copolymerizing a monomer component (a-1) comprising an acrylic acid ester and a polyfunctional monomer having two or more nonconjugated double bonds per molecule and being capable of copolymerizing with the acrylic acid ester, and has a single-layer or multilayer structure;
   thermoplastic acrylic polymer (B1):
   being produced by copolymerizing a monomer component comprising not less than 95% by weight of a methacrylic acid ester and not greater than 5% by weight of at least one selected from an acrylic acid ester and other copolymerizable vinyl monomer, and exhibits a fluidity of not greater than 8 (MFR: measured under heating at 230° C. and compression at 37.3 N); and
   thermoplastic acrylic polymer (B2):
   being produced by copolymerizing a monomer component comprising not less than 92% by weight of a methacrylic acid ester and not greater than 8% by weight of at least one selected from an acrylic acid ester and other copolymerizable vinyl monomer, and exhibits a fluidity of not less than 15 (MFR: measured under heating at 230° C. and compression at 37.3 N);
   the film having a prism type retroreflection structure formed on the surface thereof.

10. An acrylic film, which was obtained from a composition comprising the following acrylic polymer (A) and the following thermoplastic acrylic polymer (B3), and
   the gel content being 25 to 50% by weight with respect to 100% by weight in total of the acrylic polymer (A) and the thermoplastic acrylic polymer (B3),
   acrylic polymer (A):
   being produced by polymerizing a monomer component (a-2) comprising not less than 80% by weight of a methacrylic acid ester and 20 to 0% by weight of an acrylic acid ester, in the presence of a crosslinked acrylic polymer (A-1), having a graft rate of the monomer component (a-2) to the crosslinked acrylic polymer (A-1) being 50 to 140% by weight, being in a particulate form having a weight average particle diameter of 300 to 3,000 Å, and having a reduced viscosity (as measured with a 0.3% solution in N,N'-dimethylformamide at 30° C.) of methyl ethyl ketone (MEK) soluble-matter being not greater than 0.35 dl/g, wherein, the crosslinked acrylic polymer (A-1) is produced by copolymerizing a monomer component (a-1) comprising 100 parts by weight of an acrylic monomer and 0.2 to 2 parts by weight of a polyfunctional monomer having two or more nonconjugated double bonds per molecule and being capable of copolymerizing with the acrylic monomer, and has a single-layer or multilayer structure, with each layer constituting the crosslinked acrylic polymer (A-1) having a glass transition temperature of less than 0° C.; and thermoplastic acrylic polymer (B3):

being produced by copolymerizing a monomer component comprising not less than 80% by weight of a methacrylic acid ester, and 0 to 20% by weight of at least one selected from an acrylic acid ester and other copolymerizable vinyl monomer, and has a reduced viscosity of not greater than 0.35 dl/g (as measured with a 0.3% solution in N,N'-dimethylformamide at 30° C.);

the film having a prism type retroreflection structure formed on the surface thereof.

11. The acrylic film according to claim 1, wherein the composition further comprises a colorant.

12. The acrylic film according to claim 1, which has a thickness of 10 to 500 μm.

13. A retroreflection sheet constituted with the acrylic film according to claim 1.

14. A retroreflection sheet constituted with the acrylic film according to claim 1, and a surface protective film laminated on the acrylic film on the surface on which the prism type retroreflection structure was not formed.

15. The acrylic film according to claim 1, wherein the acrylic film has a prism type retroreflection structure formed on the surface thereof by thermal transfer.

16. A process for producing the acrylic film according to claim 1, comprising:
   molding a flat film from the composition, and then
   thermal transferring a prism type retroreflection structure on one surface of the flat film using a die.

17. The acrylic film according to claim 1, which exhibits a retroreflection coefficient of not less than 200.

* * * * *